(12) United States Patent
Sun et al.

(10) Patent No.: US 11,204,923 B2
(45) Date of Patent: Dec. 21, 2021

(54) PERFORMANCE FOR QUERY EXECUTION

(71) Applicant: INTERNATIONAL BUSINESS MACHINES CORPORATION, Armonk, NY (US)

(72) Inventors: ShengYan Sun, Beijing (CN); Peng Hui Jiang, Beijing (CN); Xiaobo Wang, Beijing (CN); Shuo Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/169,044

(22) Filed: Oct. 24, 2018

(65) Prior Publication Data
US 2020/0134071 A1    Apr. 30, 2020

(51) Int. Cl.
*G06F 16/2455*   (2019.01)
*G06F 16/22*    (2019.01)
*G06F 16/242*   (2019.01)
*G06F 16/2453*  (2019.01)

(52) U.S. Cl.
CPC ...... *G06F 16/2455* (2019.01); *G06F 16/2282* (2019.01); *G06F 16/2425* (2019.01); *G06F 16/24542* (2019.01)

(58) Field of Classification Search
CPC ............ G06F 16/2282; G06F 16/2425; G06F 16/24542; G06F 16/2455
See application file for complete search history.

(56) References Cited

U.S. PATENT DOCUMENTS

| | | | | |
|---|---|---|---|---|
| 6,718,322 B1 * | 4/2004 | Brye | ................... | G06F 16/2465 |
| 6,732,091 B1 * | 5/2004 | Middelfart | ........ | G06F 16/24542 |
| | | | | 707/718 |
| 7,007,006 B2 * | 2/2006 | Zilio | ....................... | G06F 16/22 |
| | | | | 707/717 |
| 8,037,057 B2 * | 10/2011 | Burger | ................ | G06F 16/2272 |
| | | | | 707/715 |
| 8,364,612 B2 * | 1/2013 | Van Gael | ............... | G06N 20/00 |
| | | | | 706/12 |
| 9,727,600 B2 | 8/2017 | Fu et al. | | |

(Continued)

OTHER PUBLICATIONS

Disclosed Anonymously, "Accessing Relational Data From A RDBMS From A NoSQL API", ip.com Disclosure No. IPCOM000235450D ,Publication Date: Feb. 28, 2014, pp. 1-6.

(Continued)

*Primary Examiner* — Miranda Le
(74) *Attorney, Agent, or Firm* — Tihon Poltavets

(57) ABSTRACT

Implementation of the present disclosure relates to a method, system and computer program product for improvement of query execution. According to one embodiment of the present invention, there is provided a method. In the method a query on data organized in a first data structure is received first. And then based on at least one property associated with the query, a second data structure is selected from a plurality of candidate data structures, wherein a performance measure of the query on the data organized in the second data structure is better than the performance measure of the query on the data organized in the first data structure. And at last the query on the data organized in the second data structure is executed. In other implementations, a system and a computer program product are disclosed.

20 Claims, 8 Drawing Sheets

(56) References Cited

U.S. PATENT DOCUMENTS

| | | |
|---|---|---|
| 2007/0022136 A1* | 1/2007 | Keller ............... G06F 16/24545 |
| 2010/0082507 A1* | 4/2010 | Ganapathi ............ G06F 16/217 |
| | | 706/12 |
| 2014/0172833 A1 | 6/2014 | Taylor |
| 2014/0214897 A1 | 7/2014 | Zhu et al. |
| 2017/0169061 A1 | 6/2017 | Cao et al. |
| 2018/0157978 A1* | 6/2018 | Buda ................... G06F 16/2455 |

OTHER PUBLICATIONS

Mell et al., "The NIST Definition of Cloud Computing", National Institute of Standards and Technology, Special Publication 800-145, Sep. 2011, pp. 1-7.

\* cited by examiner

PERFORMANCE FOR QUERY EXECUTION

BACKGROUND

The present invention relates to the technology of database, and more specifically, to methods and systems for improving performance for query execution.

With the development of information technology, various data needs to be stored and managed. For a given organization such as a government, a company, a school and so on, data associated with the organization are often organized in a specific data structure in order to facilitate management of the data. As an example, a relational database is widely used for the organization to store and manage the data because of its advantages in terms of consistency of transactions. A user such as a database programmer may submit a query to the database management system to obtain required data from the database. However, in some situations, even a very simple query might consume significant resource, which has negative impact on the responsiveness of the database.

SUMMARY

In a first aspect, embodiments of the present invention provide a method. In the method, a query on data organized in a first data structure is received first. Then based on at least one property associated with the query, a second data structure is selected from a plurality of candidate data structures, wherein a performance measure of the query on the data organized in the second data structure is better than the performance measure of the query on the data organized in the first data structure. And at last, the query on the data organized in the second data structure is executed.

In a second aspect, embodiments of the present invention provide a system. The system comprises a processing unit; and a memory coupled to the processing unit and storing instructions that, when executed by the processing unit, implement the above method.

In a third aspect, embodiments of the present invention provide a computer program product being tangibly stored on non-transient machine-readable medium and comprising machine-executable instructions. The machine-executable instructions, when executed on one or more processing units, may cause the one or more processing units to perform the above method.

It is to be understood that the Summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
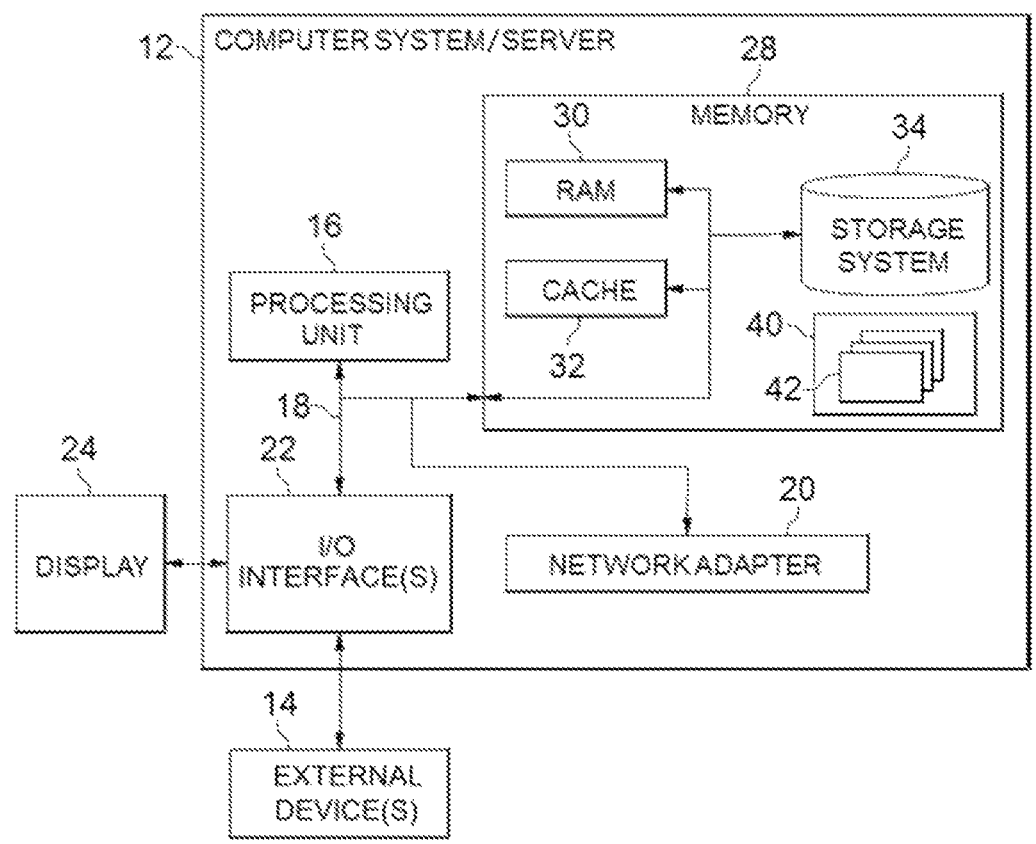
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
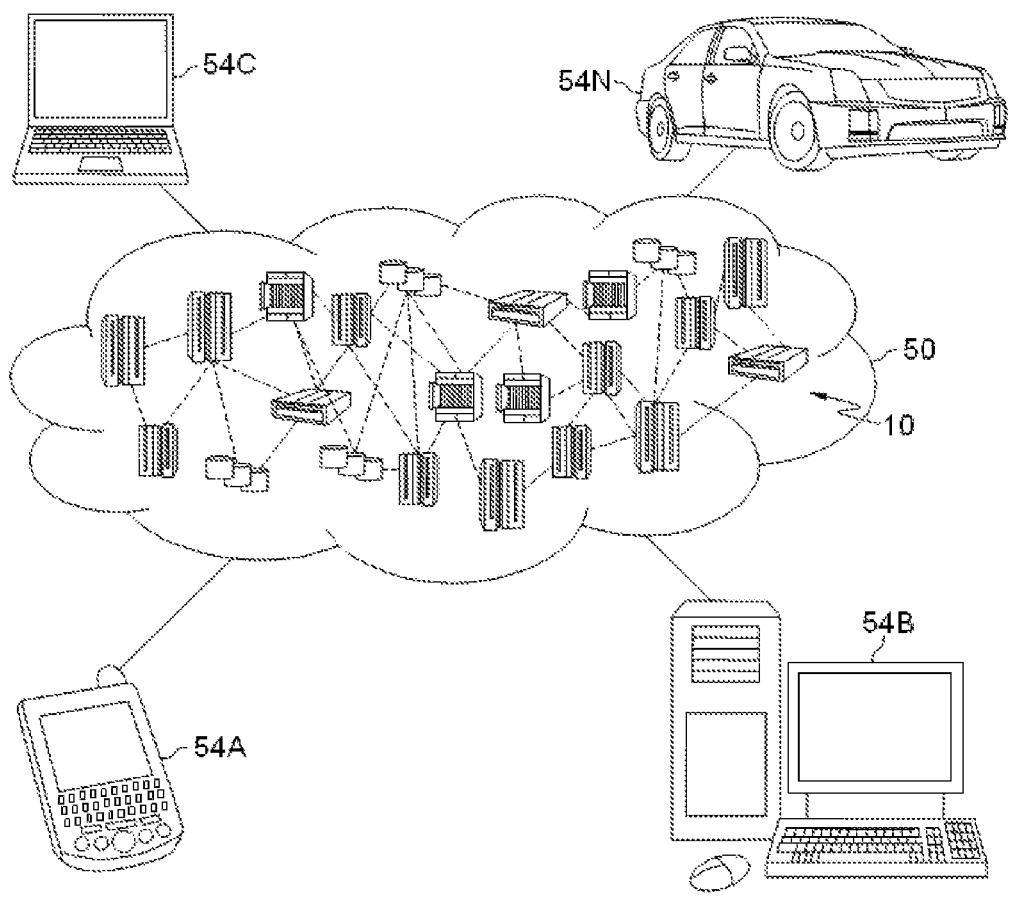
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
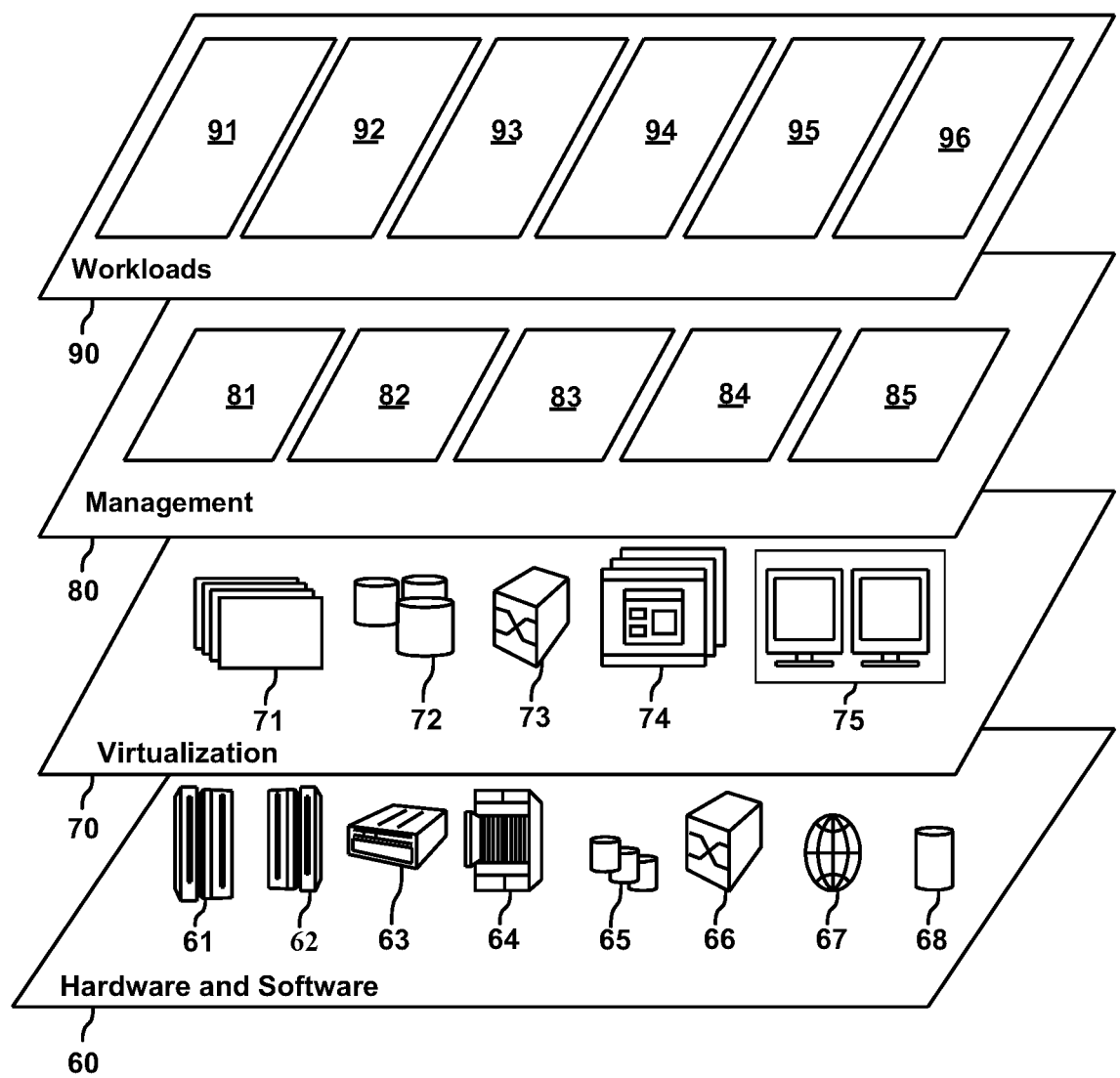
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query execution improvement 96. The query execution improvement 96 may intercept a query on data organized in a first data structure, for example a relational table, and determine performance measures of the query on the data organized in a plurality of data structures. Then the query execution improvement 96 may select a second data structure associated with a better performance measure than the first data structure to execute the query. In this way, the performance of the execution of the query can be improved, for example, a response to the query can be accelerated, and the amount of resource occupied by the execution of the query can be reduced, and so on.

As described above, data associated with a specific organization are often stored and managed in a specific data structure. A user may use a query to access the stored data and process the data. In some situations, the query may be responded significantly slow when the query is executed on the data organized in the specific data structure. In some situations, the execution of the query may need many resources when the query is executed on the data organized in the specific data structure, etc. As an example, a relational database is often employed for an organization to store and manage the data because of its advantages in terms of consistency of transactions. In the relational database, the data are organized in a two-dimension relational table. However, in some cases, a query on the data in the relational table cannot be responded quickly, or may need many processing resources to be executed. Thus there is a need to improve the performance of the query execution while keeping the advantages of the relational database.

The inventors have found that in some cases, a query on data organized in a specific data structure may be executed with better performance if the query is executed on the data organized in another data structure. Therefore, according to embodiments of the present invention, rather than the query being directly executed on the data organized in the specific data structure, it is determined whether the data organized in a different data structure is more suitable for executing the query in terms of performance. If so, the query will be executed on the data organized in the different data structure. By taking advantage of the data organized in a more suitable data structure, the performance of the query execution can be improved.

Figure 4:
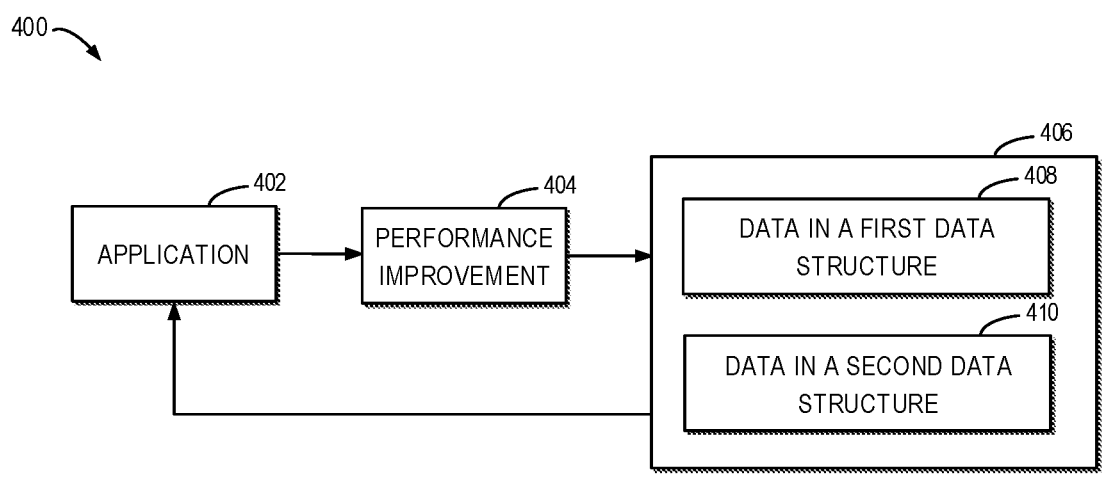
FIG. 4 depicts a block diagram of system for improving performance of query execution according to an embodiment of the present invention.

Now some example embodiments are discussed. FIG. 4 depicts a block diagram of a system 400 for improving performance of query execution according to an embodiment of the present invention.

As shown, data 408 is organized in an original data structure (referred to as "first data structure") and is stored in a memory 406. One or more copies 410 of the data 408 may be organized in one or more further data structures and also stored in the memory 406. These further data structures can be obtained, for example, based on experience, prior knowledge, or the like. The data organized in one of the further data structures (referred to as "a second data structure") is expected to result in better performance for query execution than the data organized in the first data structure. These further data structures together with the first data structure may be referred to as "candidate data structures" herein.

It is to be understood that for clarity and simplicity, FIG. 4 only shows the data organized in one of the further data structures (the second data structure). However, it may be appreciated that the data can be organized in two or more further data structures.

In operation, an application 402 may submit a query on the data 408 organized in the first data structure. The query may be interpreted, for example, by a performance improvement component 404. In some embodiments, the performance improvement component 404 is implemented in a cloud computing node 10 as shown in FIG. 2. As an alternative, a local deployment of the performance improvement component 404 is possible in some other embodiments.

Then the interpreted query can be parsed to determine at least one property associated with the query. Examples of the at least one property include, but are not limited to, a type of the query, a frequency of the query being executed, a structure of the query, a length of a record in the data structure, or a frequency of the data structure being manipulated.

The type of the query may indicate whether the query is to only access data or change data. For instance, in the case that the data 408 are stored in a relational database, the type of the query may indicate whether the query is a "SELECT" statement, "UPDATE" statement, "INSERT" statement, "DELETE" statement, and the like.

The frequency of the query being executed may indicate the number of times of the query being executed on the data associated with the query in the past. The frequency of the query being executed may also indicate whether the query is the most frequency query executed on the data. The structure of the query may indicate an index, a filter factor, a predicate type associated with the query, etc.

Based on the at least one determined property, the second data structure is selected from the candidate data structures. In some embodiments, the performance measures of the query on data organized in the candidate data structures may be determined based on the at least one property. The second data structure may be selected based on the performance measures, such that a performance measure of the query on the data organized in the second data structure is better than a performance measure of the query on the data organized in the first data structure. In some embodiments, the second data structure may be a data structure which is expected to provide the best performance measure among the candidate data structures. The performance measure may be any relevant metric including, but not limited to a response time, resource occupation, I/O cost, or the like.

In some embodiments, the selection of the second data structure is based on a prediction model. More specifically, the prediction model may be used to predict respective performance measures of the query on the data organized in the candidate data structures based on the at least one determined property. Then the data organized in a data structure associated with a better performance measure may be selected for executing the query. As used herein, the term "prediction model" refers to any model indicating relationships between at least one property of historical queries and performance measures of the historical queries on the data organized in the candidate data structures. The generation and use of the prediction model will be described in details below with reference to FIG. 5.

If the second data structure is selected, the query is executed on the data 410 organized in the second data structure instead of on the data 408 organized in the first data structure. For example, the performance improvement component 404 may execute the query on the data 410 organized in the selected data structure. Otherwise, if the first data structure is determined to have better performance than other data structures, the performance improvement component 404 may directly execute the query on the data 408 organized in the first data structure. The result of executing the query may be then passed to the application 402 for subsequent processing.

In some embodiments, the performance improvement component 404 may determine whether to select a different data structure from the first data structure for the query execution based on various factors. As an example, the performance improvement component 404 may monitor the performance measure of a query being executed on the data organized in the first data structure. If the monitored performance measure is lower than a threshold, the performance improvement component 404 may determine to select the second data structure so as to achieve better execution performance. In some cases, instead of directly executing the query to monitor the performance measure of the query with respect to the first data structure, the performance improvement component 404 may predict this performance measure using the prediction model.

Alternatively, or in addition, to select the second data structure, the performance improvement component 404 may consider availability of the data organized in the second data structure. FIG. 4 shows an example where the data organized in the second data structures are already stored in the memory 406 and available. However, in some other cases, the data organized in the second data structure may be unavailable, for example, not stored in the memory 406. It may take a long time to reorganize the data in the second data structure. And it might be slower to execute the query by reorganizing the data in the second data structure than to directly execute the query on the data organized in the first data structure. In this case, the query may be directly executed on the data organized in the first data structure. Moreover, after the query is executed, to facilitate subsequent query execution on the data organized in the second data structure, especially when it is monitored that the performance of the query with respect to the first data structure is low, the performance improvement component 404 may generate the data organized in the second data structure and store it in the memory 406 for a future query to use. In this way, if a subsequent query is suitable to be executed on the data organized in the second data structure, the execution performance of that query can be improved.

In this way, it is possible to ensure that the query can be executed on the data organized in a more suitable data structure. Thus the performance of executing queries can be improved compared with always executing queries on the data organized in the same original data structure. For example, a query can be responded more quickly, the amount of resources occupied by the query can be reduced, or the I/O cost associated with the execution of the query can be reduced.

Figure 5:
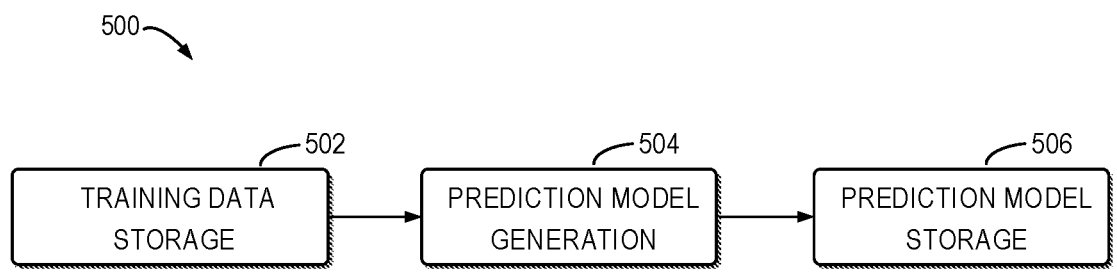
FIG. 5 depicts a block diagram of system for generating a prediction model according to an embodiment of the present invention.

As described above, a prediction model may be used to predict respective performance measures of a query on data organized in a plurality of candidate data structures. FIG. 5 depicts a block diagram of a system 500 for generating the prediction model according to some embodiments of the present invention.

As shown, the system 500 includes training data storage 502 storing training data for generating the prediction model. As mentioned above, the prediction model indicates relationships between at least one property of historical queries in the training data set and performance measures of the historical queries on the data organized in the plurality of candidate data structure. To train such a model, the training data may include the at least one property of historical queries and the performance measure of the historical queries. These historical queries may be obtained by monitoring and collecting queries executed on the data organized in their original data structures including all the candidate data structures. The training data may be generated from the historical queries.

In some embodiments, for each of the historical queries, at least one property associated with the historical query may be extracted from the historical query. Examples of the at least one property include, but are not limited to, a type of the historical query, a frequency of the historical query being executed, a structure of the historical query, a length of a record in the original data structure being manipulated, or a frequency of the original data structure being manipulated. Further, the historical query may be executed on data organized in each of the candidate data structures or at least some of the candidate data structures, so as to obtain the performance measure of the historical query on the data structure, such as the response time, resource occupation, I/O cost or any combination thereof. The at least one property extracted from a historical query and the performance measures of the historical query on the data organized in the plurality of candidate data structures may form a training sample of the training data.

As an specific example, in the case where the plurality of candidate data structures include a relational table, a hash table, a link list, a jump table, a dictionary, a data set and array, the historical query may be executed on the data organized in each of the above data structures respectively. Then the performance measures corresponding to each of the above data structures can be obtained respectively based on the execution of the query. In some embodiments, the performance measure corresponding to a given data structure may be a weighted sum of the response time, resource occupation, I/O cost of the query on the data organized in the given data structure.

The training data may be used, for example by a prediction model generating module 504 in the system 500 to generate the prediction model. The prediction model indicates relationships between at least on property of historical queries in the training data and performance measures of the historical queries on the data organized in the plurality of candidate data structure, and can be used by performance improvement component 404 to select a suitable data structure for executing a future query. The prediction model generating module 504 may be implemented in the cloud computing node 10. As an alternative, a local deployment of the prediction model generating module 504 is possible in some other embodiments. The prediction model generating module 504 may use various machine learning techniques to generate the prediction based on the training data. Examples of the machine learning techniques include, but not limited to a neural network, support vector machine and the like.

The generated prediction model may be stored in prediction model storage 506 for use, for example, by the performance improvement component 404 shown in FIG. 1. Although the prediction model storage 506 is illustrated to be separate from the training data storage 502, it should be appreciated that they may be integrated into one component.

To use the prediction model, the performance improvement component 404 may obtain the prediction model from the prediction model storage 506 and input at least one property of a received query into the prediction model. The prediction model may predict, based on the at least one property, respective performance measures of the query on the data organized in the candidate data structures and return the predicted performance measures to the performance improvement component 404. The performance improvement component 404 may select a suitable data structure from the candidate data structures based on the performance measures.

Figure 6:
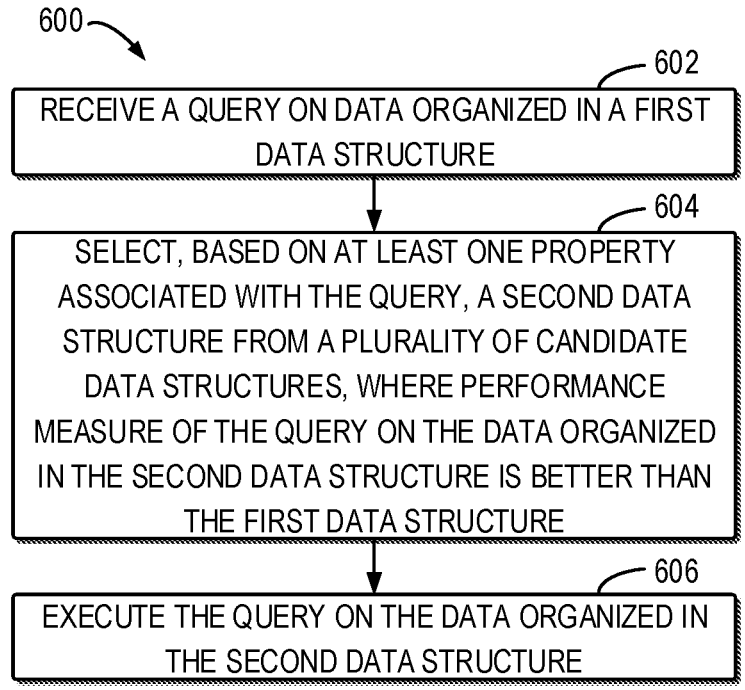
FIG. 6 depicts a flow chart of a method for improving performance of query execution according to an embodiment of the present invention.

Reference is now made to FIG. 6, which illustrates a flow chart of a method 600 for improving performance of query execution according to an embodiment of the present invention. The method 600 may be performed by the cloud computing node 10, especially by the performance improvement component 404 implemented in the cloud computing node 10.

Figure 8A:
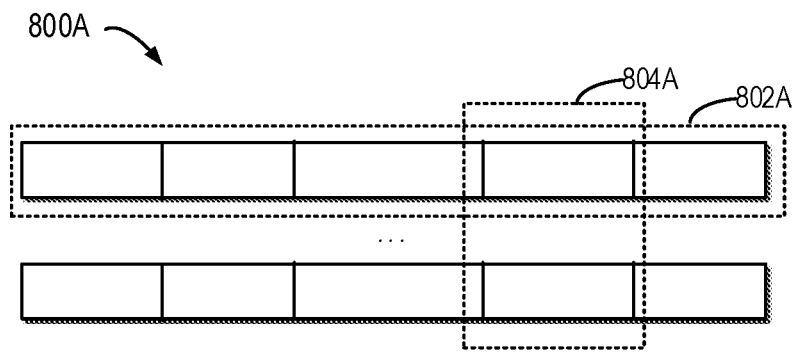
FIG. 8A-8D depicts several data structures used in an embodiment of the present invention.

At block 602, the cloud computing node 10 receives a query on data organized in a first data structure. The first data structure is an original data structure for organizing the data. In an embodiment of the present invention, the first data structure includes a relational table in a relational database. FIG. 8A depicts a relational table 800A used in the relational database. As shown in FIG. 8A, the table 800A organizes data in a plurality of rows 802A and a plurality of columns 804A.

At block 604, the cloud computing node 10 selects, based on at least one property associated with the query, a second data structure from a plurality of candidate data structures, where a performance measure of the query on the data organized in the second data structure is better than the performance measure of the query on the data organized in the first data structure. In some embodiments, the performance measure of the query on the data organized in the second data structure is better than rest of the plurality of candidate data structures. In an embodiment of the present invention, the at least one property may include, but not limited to a type of the received query, a frequency of the query being executed, a structure of the query, a length of a record in the data structure, or a frequency of the data structure being manipulated.

In an embodiment, the second data structure is selected based on a prediction model indicating relationships between the at least one property of historical queries and performance measures of the historical queries on data organized in the plurality of candidate data structures. In the embodiment, the cloud computing node 10 may obtain the prediction model and input the at least one property of the query to the prediction model. The prediction model may predict, based on the at least one property, respective performance measures of the query on the data organized in the plurality of candidate data structures. The computing node 10 may obtain the predicted performance measures and select, from the plurality of candidate data structures, the second data structure based on the respective performance measures. In an embodiment, the prediction model may be generated by the cloud computing node 10. A method for generating the prediction model will be described in details with reference to FIG. 7.

Figure 8B:
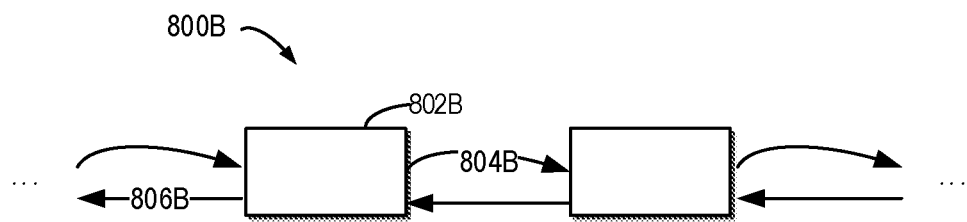
Figure 8C:
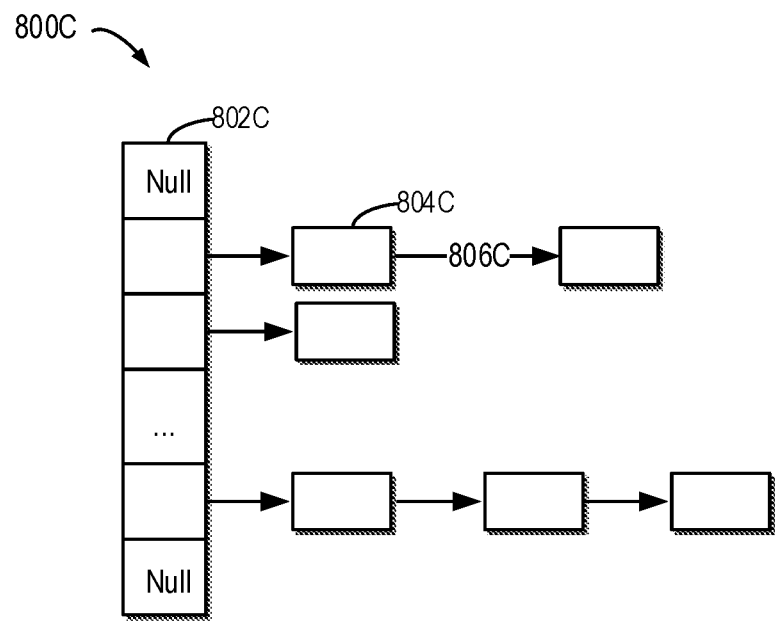
Figure 8D:
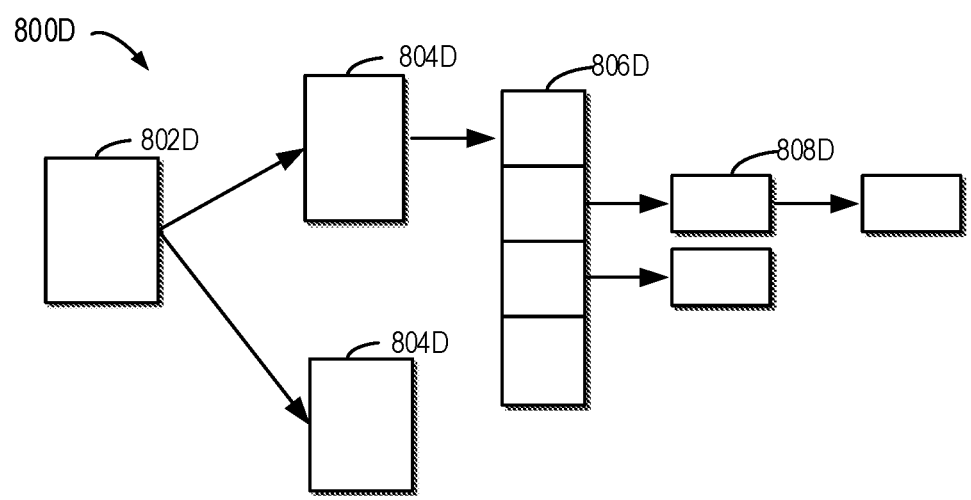

In an embodiment of the present invention, the candidate data structures may include the first data structure and may be selected from a group consisting of a table in a relational database, a link list, hash table, jump table, dictionary and data set. FIGS. 8B to 8D depict the data structures used in an embodiment of the present invention, respectively. These data structures illustrated in FIGS. 8B to 8D can be used to improve the performance of the query on the data organized in the relational table 800A shown in FIG. 8A. It should be appreciated, FIGS. 8B to 8D are merely exemplary and embodiments of the present invention are not limited to these data structures.

FIG. 8B depicts a diagram of a link list 800B. The link list 800B may include at least one node 802B including a data field associated with data. In addition to the data field, the node 802 B further includes a pointer 804B pointing to a next node of the link list 800B and a pointer 806B pointing to a previous node of the link list 800B.

FIG. 8C depicts a diagram of a hash table 800C. The hash table 800C includes a list 802C of storage addresses associated with data. An address in the list 802C is determined based on a key of data via hash algorithm. The hash table 800C further includes at least one node 804C associated with the data. The node 804C may have a pointer 806C pointing to a node having the same hash value as the node 804C.

FIG. 8D depicts a diagram of a dictionary 800D. The dictionary 800D includes a header 802D indicating the name of the dictionary 800D, the type of the dictionary 800D, and on the like. The dictionary 800D further includes a sub-header 804D indicating the size of the data associated with the sub-header 804D, address list 806D of the data. A node 808D in the dictionary 800D indicates the information associated with the data, such as the key of the data, the value of the data, and the like.

The link list 800B, hash table 800C and dictionary 800D shown in FIGS. 8B-8D can support sorted data. In some situations, for example in the case where a query on data organized in the relational table 800A is for only accessing data rather than changing data, a higher performance can be obtained if the query is executed on the data organized in one of these data structures. For example, the query can be responded more quickly, the amount of resources occupied by the query can be reduced, or the I/O cost associated with the execution of the query can be reduced.

At block 606, the cloud computing node 10 executes the query on the data organized in the second data structure. In an embodiment of the present disclosure, the cloud computing node 10 may transform the query to an operation associated with the second data structure and then perform the operation on the data organized in the second data structure. For example, in the case of the relational database, if the query is a "SELECT" statement for accessing a specific column, the cloud computing node 10 may transform the "SELECT" statement to an operation of searching for data associated with the specific column against the data organized in the second data structure.

In an embodiment of the present invention, the cloud computing node 10 may select the second data structure further based on at least one of the following: the performance measure of the query on the data organized in the first data structure being lower than a threshold; and availability of the data organized in the second data structure.

In an embodiment of the present invention, the cloud computing node 10 may generate the data organized in the second data structure in response to the data organized in the second data structure being unavailable.

Method 600 can discover a data structure associated with better performance measure of the execution of the query from a plurality of data structures, and execute the query on the data organized in the data structure. In this way, the execution performance of the query can be optimized. For example, the query can be responded more quickly, amount of resources occupied by the execution of the query can be reduced, the I/O cost associated with the execution of the query can be reduced, and the like.

Figure 7:
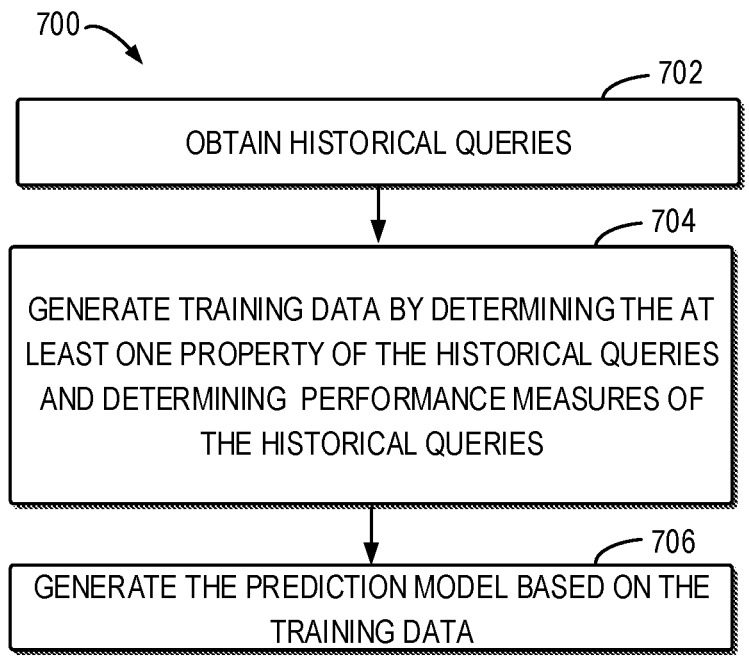
FIG. 7 depicts a flow chart of a method for generating a prediction model according to an embodiment of the present invention.

As described above, a prediction model may be used to predict respective performance measures of the query on the plurality of candidate data structures. FIG. 7 depicts a flow chart of a method 700 for generating the prediction model according to an embodiment of the present invention. In an embodiment of the present invention, the method 700 may be performed by the cloud computing node 10, especially by the prediction model generating module 504 implemented in the cloud computing node 10.

At block 702, the cloud computing node 10 may obtain historical queries. In the case of the relational database, the historical queries may be obtained from a database management system.

At block 704, the cloud computing node 10 may generate training data by determining the at least one property of the historical queries and determining the performance measures of the historical queries by executing the historical queries on data organized in the plurality of candidate data structures. In some embodiments, the cloud computing node 10 may determine, for a given historical query, the at least one property of the given historical query, and the performance measures of the given historical query by executing the given historical query on the data organized in each of the plurality of candidate data structures.

At block 706, the cloud computing node 10 may generate the prediction model based on the training data. In some embodiments, the cloud computing node 10 may employ a neural network such as convolutional neural network (CNN) to generate the prediction model.

In method 700, historical queries having performance measures on the data organized in the plurality of data structures are used to generate the prediction model for predicting performance measures of a future query on the data organized in the plurality of data structures. In this way, a data structure associated with better performance can be predicted, and the performance of the query execution can be improved.

Figure 9:
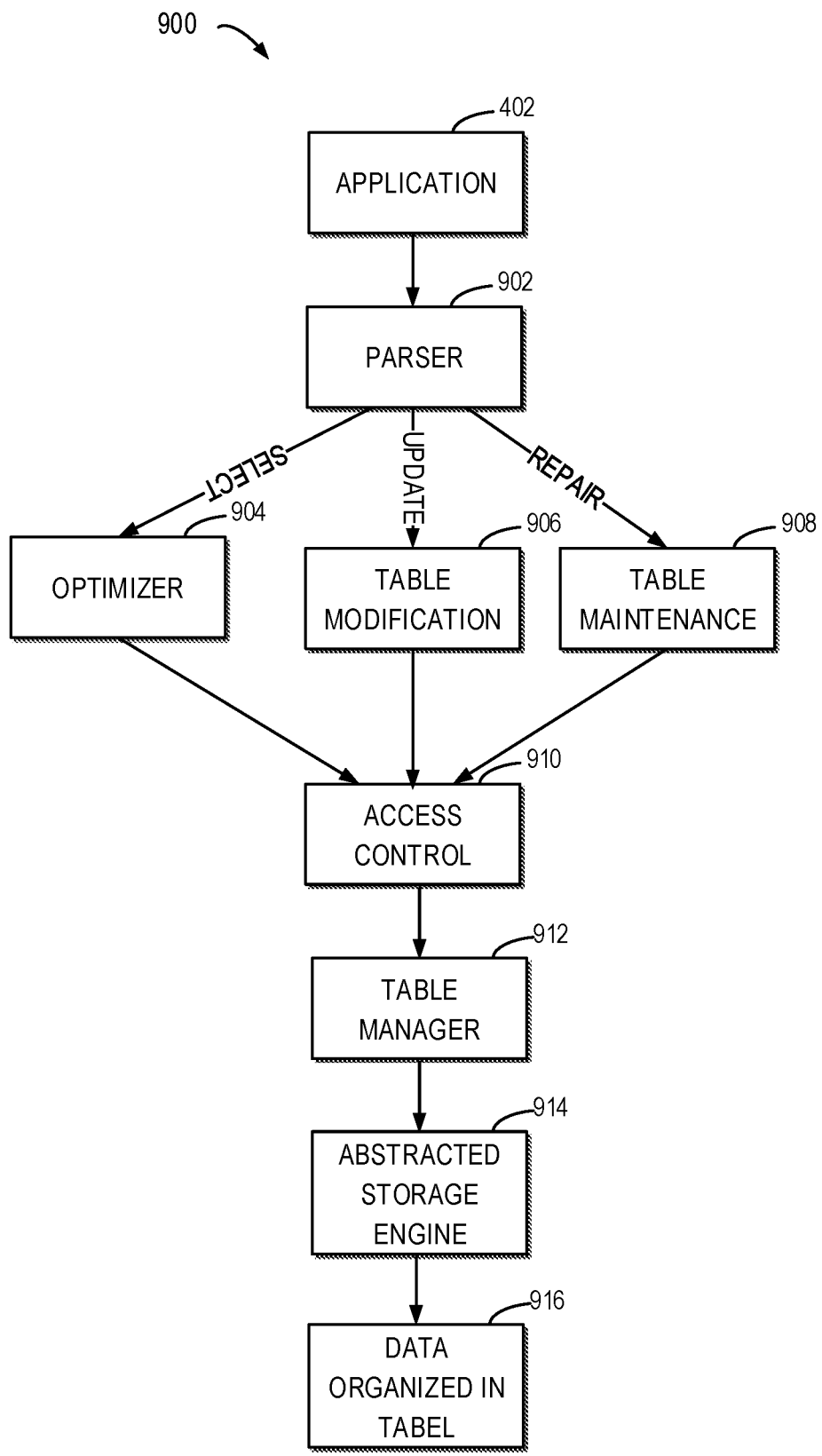
FIG. 9 depicts a block diagram of process for executing a query in a traditional relational database.

Now take a relational database as an example to describe advantages of embodiments of the present invention. FIG. 9 depicts a block diagram of a process 900 for executing a query in a traditional relational database.

In a traditional relation database, a query from the application 402 is firstly analyzed in a parser 902. The parser 902 then sends the query to a respective component depending on the analysis. For example, if the query is in a form of a "SELECT" statement, the query is sent to an optimizer 904 for processing. If the query is in a form of an "UPDATE" statement, the query is sent to a table modification module 906. If the query is in a form of a "REPAIR" statement, the query is sent to a table maintenance module 908 for processing. Then the query is processed by an access control module 910, a table manager 912, and an abstracted storage engine 914. At last the query arrives at data organized in the relational table 916. As can be seen, in the traditional relational database, a query needs to be processed by a plurality of components before the response to the query is returned.

In contrast, according to the present invention, if a query on the data organized in the relational table is determined to be suitable for execution on the data organized in a data structure other than the relational table, the query will be executed on the data organized in the data structure, rather than on the relational data base. Thus the processing in the parser 902, optimizer 904, table modification module 906, table maintenance module 908, access control module 910, table manager 912 and abstracted storage engine 914 can be omitted. Therefore, the resources associated with the processing in the parser 902, optimizer 904, table modification module 906, table maintenance module 908, access control module 910, table manager 912 and abstracted storage engine 914 can be saved, while accelerating the response to the query. Thus, the execution performance of the query can be significantly improved.

It should be noted that the processing of improving performance for query execution according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, by one or more processing units, a query on data organized in a first data structure;
    selecting, by one or more processing units, based on at least one property associated with the query, a second data structure from a plurality of candidate data structures, wherein the second data structure is selected based on a prediction model indicating relationships between at least one property of historical queries and a performance measure of the historical queries on data organized in the plurality of candidate data structures, wherein the performance measure of the query on the data organized in the second data structure is less than a performance measure of the query on the data organized in the first data structure, wherein the performance measure of the query on the data organized in the first data structure includes at least a first I/O cost of the query on the data organized in the first data structure and the performance measure of the query on the data organized in the second data structure includes at least a second I/O cost of the query on the data organized in the second data structure;
    wherein selecting the second data structure includes:
        obtaining, by one or more processing units, the prediction model;
        inputting, by one or more processing units, the at least one property of the query to the prediction model;
        obtaining, by one or more processing units, from the prediction model, respective performance measures of the query on the data organized in the plurality of candidate data structures; and
        selecting, by one or more processing units, from the plurality of candidate data structures, the second data structure based on the respective performance measures; and
    responsive to transforming the query on the data organized in the first data structure to an operation executable on the second data structure, executing, by one or more processing units, the query on the data organized in the second data structure.

2. The method of claim 1, wherein the performance measure of the query on the data organized in the second data structure is better than a remaining portion of the plurality of candidate data structures.

3. The method of claim 1, wherein the prediction model is generated by:
    obtaining, by one or more processing units, the historical queries;
    generating, by one or more processing units, training data by:
        determining, by one or more processing units, the at least one property of the historical queries, and
        determining, by one or more processing units, the performance measures of the historical queries by executing the historical queries on data organized in the plurality of candidate data structures; and
    generating, by one or more processing units, the prediction model based on the training data.

4. The method of claim 3, wherein determining the performance measures of the historical queries further comprises:
    determining, by one or more processing units, for a given historical query, the performance measures of the given historical query by executing the given historical query on the data organized in each of the plurality of candidate data structures.

5. The method of claim 1, wherein the at least one property includes at least one of: a type of the query, a frequency of the query being executed, a structure of the query, a length of a record in the data structure, or a frequency of the data structure being manipulated.

6. The method of claim 1, wherein the candidate data structures include the first data structure and are selected from a group consisting of a table in a relational database, hash table, link list, jump table, dictionary, and data set.

7. The method of claim 1, wherein selecting the second data structure is further based on at least one of the following:
    the performance measure of the query on the data organized in the first data structure being lower than a threshold, and
    availability of the data organized in the second data structure.

8. The method of claim 1, further comprising:
in response to the data organized in the second data structure being unavailable, generating, by one or more processing units, the data organized in the second data structure.

9. A computer system comprising:
one or more computer processors;
one or more computer readable storage media; and
program instructions stored on the computer readable storage media for execution by at least one of the one or more computer processors, the program instructions comprising:
program instructions to receive a query on data organized in a first data structure;
program instructions to select based on at least one property associated with the query, a second data structure from a plurality of candidate data structures, wherein the second data structure is selected based on a prediction model indicating relationships between at least one property of historical queries and a performance measure of the historical queries on data organized in the plurality of candidate data structures, wherein the performance measure of the query on the data organized in the second data structure is less than a performance measure of the query on the data organized in the first data structure, wherein the performance measure of the query on the data organized in the first data structure includes at least a first I/O cost of the query on the data organized in the first data structure and the performance measure of the query on the data organized in the second data structure includes at least a second I/O cost of the query on the data organized in the second data structure;
wherein the program instructions to select the second data structure includes:
program instructions to obtain the prediction model;
program instructions to input the at least one property of the query to the prediction model;
program instructions to obtain from the prediction model, respective performance measures of the query on the data organized in the plurality of candidate data structures; and
program instructions to select the second data structure based on the respective performance measures; and
program instructions to, responsive to transforming the query on the data organized in the first data structure to an operation executable on the second data structure, execute the query on the data organized in the second data structure.

10. The computer system of claim 9, wherein the performance measure of the query on the data organized in the second data structure is better than a remaining portion of the plurality of candidate data structures.

11. The computer system of claim 9, further comprises program instructions, stored on the one or more computer readable storage media, which when executed by a processor, cause the processor to:
obtain the historical queries;
generate training data by:
determine the at least one property of the historical queries, and
determine the performance measures of the historical queries by executing the historical queries on data organized in the plurality of candidate data structures; and
generate the prediction model based on the training data.

12. The computer system of claim 11, wherein determining the performance measures of the historical queries further comprises program instructions, stored on the one or more computer readable storage media, which when executed by a processor, cause the processor to:
determine, for a given historical query, the performance measures of the given historical query by executing the given historical query on the data organized in each of the plurality of candidate data structures.

13. The computer system of claim 9, wherein the at least one property includes at least one of: a type of the query, a frequency of the query being executed, a structure of the query, a length of a record in the data structure, or a frequency of the data structure being manipulated.

14. The computer system of claim 9, wherein the candidate data structures include the first data structure and are selected from a group consisting of a table in a relational database, hash table, link list, jump table, dictionary, and data set.

15. The computer system of claim 9, wherein program instructions to select the second data structure is further based on at least one of the following:
the performance measure of the query on the data organized in the first data structure being lower than a threshold, and
availability of the data organized in the second data structure.

16. The computer system of claim 9, further comprising program instructions, stored on the one or more computer readable storage media, which when executed by a processor, cause the processor to: in response to the data organized in the second data structure being unavailable, generate the data organized in the second data structure.

17. A computer program product comprising:
one or more computer readable storage media and program instructions stored on at least one of the one or more storage media, the program instructions comprising:
program instructions to receive a query on data organized in a first data structure;
program instructions to select based on at least one property associated with the query, a second data structure from a plurality of candidate data structures, wherein the second data structure is selected based on a prediction model indicating relationships between at least one property of historical queries and a performance measure of the historical queries on data organized in the plurality of candidate data structures, wherein the performance measure of the query on the data organized in the second data structure is less than a performance measure of the query on the data organized in the first data structure, wherein the performance measure of the query on the data organized in the first data structure includes at least a first I/O cost of the query on the data organized in the first data structure and the performance measure of the query on the data organized in the second data structure includes at least a second I/O cost of the query on the data organized in the second data structure;
wherein the program instructions to select the second data structure includes:
program instructions to obtain the prediction model;
program instructions to input the at least one property of the query to the prediction model;
program instructions to obtain from the prediction model, respective performance measures of the query on the data organized in the plurality of candidate data structures; and program instructions to select the second data structure based on the respective performance measures; and program instructions to, responsive to transforming the query on the data organized in the first data structure to an operation executable on the second data structure, execute the query on the data organized in the second data structure.

18. The computer program product of claim 17, wherein the performance measure of the query on the data organized in the second data structure is better than a remaining portion of the plurality of candidate data structures.

19. The computer program product of claim 17, further comprises program instructions, stored on the one or more computer readable storage media, which when executed by a processor, cause the processor to:

obtain the historical queries;
generate training data by:
determine the at least one property of the historical queries, and
determine the performance measures of the historical queries by executing the historical queries on data organized in the plurality of candidate data structures; and generate the prediction model based on the training data.

20. The computer program product of claim 19, wherein program instructions to determine the performance measures of the historical queries further comprises program instructions, stored on the one or more computer readable storage media, which when executed by a processor, cause the processor to:

determine, for a given historical query, the performance measures of the given historical query by executing the given historical query on the data organized in each of the plurality of candidate data structures.

* * * * *